(12) United States Patent
Saracco et al.

(10) Patent No.: US 10,001,656 B2
(45) Date of Patent: Jun. 19, 2018

(54) DEVICES AND METHODS FOR SPECKLE REDUCTION IN SCANNING PROJECTORS

(71) Applicant: Microvision, Inc., Redmond, WA (US)

(72) Inventors: Matthieu Saracco, Redmond, WA (US); Roeland Collet, Olympia, WA (US)

(73) Assignee: Microvision, Inc., Redmond, WA (US)

( * ) Notice: Subject to any disclaimer, the term of this patent is extended or adjusted under 35 U.S.C. 154(b) by 130 days.

(21) Appl. No.: 15/096,791

(22) Filed: Apr. 12, 2016

(65) Prior Publication Data

US 2017/0293156 A1   Oct. 12, 2017

(51) Int. Cl.
| | |
|---|---|
| *G03B 21/14* | (2006.01) |
| *H04N 9/31* | (2006.01) |
| *G02B 27/48* | (2006.01) |
| *G02B 27/28* | (2006.01) |
| *G02B 26/10* | (2006.01) |
| *G02B 1/11* | (2015.01) |
| *G03B 21/20* | (2006.01) |

(52) U.S. Cl.
CPC ............ *G02B 27/48* (2013.01); *G02B 1/11* (2013.01); *G02B 26/105* (2013.01); *G02B 27/285* (2013.01); *G03B 21/206* (2013.01); *G03B 21/2033* (2013.01); *G03B 21/2073* (2013.01); *H04N 9/3129* (2013.01); *H04N 9/3135* (2013.01); *H04N 9/3161* (2013.01); *H04N 9/3167* (2013.01)

(58) Field of Classification Search
CPC .... G03B 21/14; G03B 21/005; G03B 21/003; G03B 21/206; G03B 21/208; G03B 21/29; H04N 9/00; H04N 9/3129; H04N 9/3161; H04N 9/31; G02B 27/48
See application file for complete search history.

(56) References Cited

U.S. PATENT DOCUMENTS

| | | | |
|---|---|---|---|
| 6,897,992 B2 * | 5/2005 | Kikuchi | G02B 5/1828 345/7 |
| 7,970,028 B2 * | 6/2011 | Kuksenkov | H04N 9/3129 372/24 |
| 2007/0273953 A1 * | 11/2007 | Hwang | G02B 27/48 359/279 |

(Continued)

OTHER PUBLICATIONS

Abele, et al., "Speckle Reduction Technique for Embeddable for MEMS-Laser Picoprojector", MOEMS and Miniaturized Systems XIII, Proc. of SPIE vol. 8977, Mar. 7, 2014.

(Continued)

*Primary Examiner* — William C Dowling
(74) *Attorney, Agent, or Firm* — Kevin D. Wills

(57) ABSTRACT

Devices and methods are described herein that use a first solid figure element, a polarizing beam splitter, and a second solid figure element to reduce speckle in projected images. Specifically, laser light is generated and split into two portions having orthogonal polarizations. The first portion of laser light is internally reflected off at least three internal faces of the second solid figure element and is then spatially recombined with the second portion of laser light in the first solid figure element. The difference in path length followed by the two portions generates a temporal incoherence in the recombined laser light beam, and that temporal incoherence reduces speckle in the projected image.

18 Claims, 14 Drawing Sheets

(56) References Cited

U.S. PATENT DOCUMENTS

2013/0258210 A1 10/2013 Kurihara et al.
2015/0226975 A1* 8/2015 Le Gros ............... G02B 27/283
                                                          353/30

OTHER PUBLICATIONS

Trisnadi, , "Speckle Contrast Reduction in Laser Projection Displays", Proc. SPIE 4657, Projection Displays VIII, 131, Apr. 30, 2002.

* cited by examiner

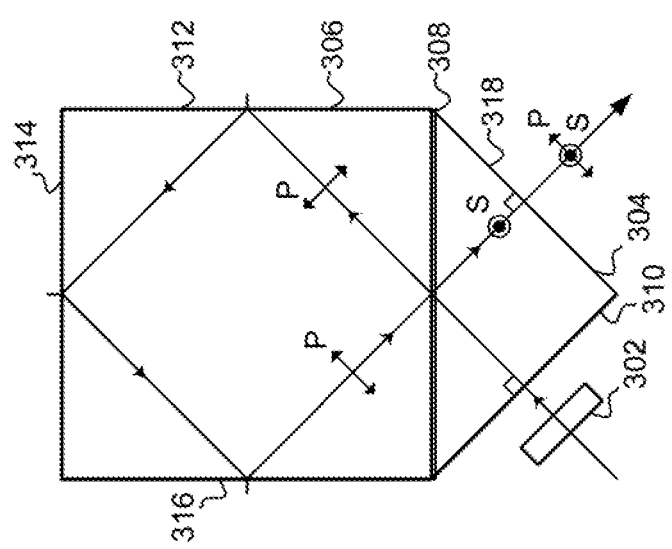

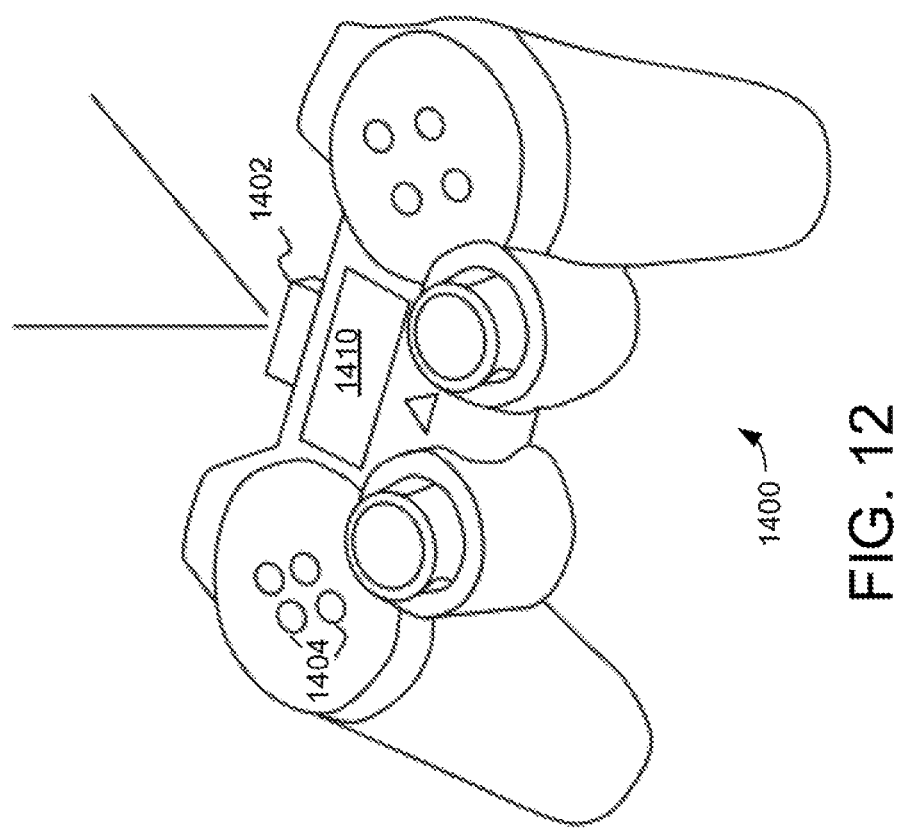

DEVICES AND METHODS FOR SPECKLE REDUCTION IN SCANNING PROJECTORS

FIELD

The present disclosure generally relates to projectors, and more particularly relates to scanning laser projectors.

BACKGROUND

In scanning laser projectors, pixels are typically generated by modulating light from laser light sources as a scanning mirror scans the modulated light in a raster pattern. One continuing issue in scanning laser projectors is "speckle". In general, speckle is an image artifact that can reduce the quality of projected images. Speckle occurs when a coherent light source is projected onto a randomly diffusing surface. When highly coherent light reflects off a rough surface, various components of the light combine to form patches of higher intensity light and lower intensity light. To the human eye or other detector with a finite aperture, these patches of variable intensity appear as speckles, as some small portions of the image look brighter than other small portions. Furthermore, these intensity differences can vary depending on observer's position, and thus the speckles can appear to change when the observer moves.

As such, speckle can significantly reduce the quality of image generated by a coherent source, such as laser in a scanning laser projector.

BRIEF DESCRIPTION OF THE DRAWINGS

FIGS. 3A, 3B, 3C and 3D show schematic views of speckle reduction components in accordance with various embodiments of the present invention;

FIG. 12 shows a perspective view of a gaming apparatus in accordance with various embodiments of the present invention.

DESCRIPTION OF EMBODIMENTS

In general, the embodiments described herein provide a scanning laser projector that reduces speckle to improve image quality. In general, the scanning laser projector generates a temporal incoherence in the laser light beam used to project an image, and that temporal incoherence reduces speckle in the projected image.

In one embodiment, a speckle reduction component is included in the scanning laser projector, where the speckle reduction component includes a polarizing beam splitter positioned between a first solid figure element and a second solid figure element. The first solid figure element, polarizing beam splitter, and second solid figure element are configured to split the laser light into a first portion of the laser light having P polarization and a second portion of the laser light having S polarization. The first portion of laser light is internally reflected off at least three internal faces of the second solid figure element and is then spatially recombined with the second portion of laser light in the first solid figure element. The recombined light beams are then passed to at least one scanning mirror and reflected into a raster pattern of scan lines to form a projected image.

In such embodiments, the splitting of the laser light into a first portion and a second portion, where the first portion is internally reflected off three internal faces of the second solid figure element before being spatially recombined with the first portion, generates a relative delay between the two portions. When the two portions are recombined, this relative delay results in a temporal incoherence between the two portions in the recombined laser light beam. This temporal incoherence reduces speckle in the projected image. Specifically, the temporal incoherence of the two recombined light beams, where the two recombined light beams have an orthogonal polarization orientation, effectively creates two uncorrelated speckle patterns in the projected image. These two uncorrelated speckle patterns partially average out and thus reduce the amount of speckle that is apparent to a viewer of the projected image. Furthermore, the various embodiments can provide such a speckle reduction in a relatively compact sized device and with relatively high optical power efficiency. Specifically, the embodiments provide the delay with internal reflection on at least three faces of the second solid figure element. As will be described in greater detail below, the internal reflection off at least three faces of the second solid figure element can provide the temporal delay needed to effectively reduce speckle in the projected image while having relatively small dimensions. Furthermore, the internal reflection off at least three faces facilitates low optical power loss, and thus can provide the temporal delay needed to effectively reduce speckle in the projected image while maintaining relatively high efficiency.

Figure 1:
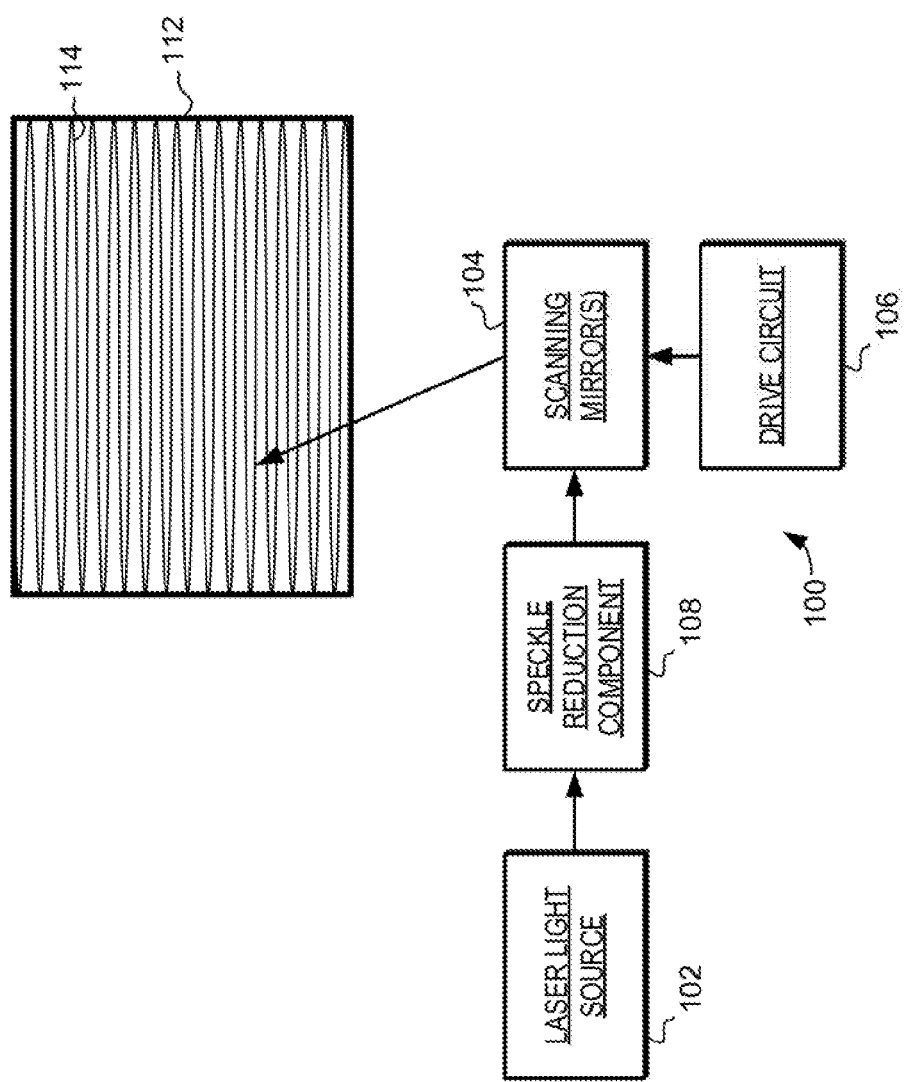
FIG. 1 shows a schematic diagram of a scanning laser projector in accordance with various embodiments of the present invention.

Turning now to FIG. 1, a schematic diagram of a scanning laser projector 100 is illustrated. The scanning laser projector 100 includes a laser 102, scanning mirror(s) 104, a drive circuit 106, and a speckle reduction component 108. During operation, the laser 102 provides a beam of laser light is encoded with pixel data to generate image pixels that are to be projected by the scanning laser projector 100. To facilitate this, the drive circuit 106 controls the movement of the scanning mirror(s) 104. Specifically, the drive circuit 106 provides excitation signal(s) to excite motion of the scanning mirror(s) 104.

The scanning mirror(s) 104 reflect the laser light beam into an image region 112. Specifically, during operation of the scanning light projector 100, the scanning mirror(s) 104 are controlled by the drive circuit 106 to reflect the beams of laser light into a raster pattern 114. This raster pattern 114 of laser light beam generates a projected image. In general, the horizontal motion of the beam of laser light in this raster pattern 114 define rows of pixels in the projected image, while the vertical motion of the beams of laser light in the raster pattern 114 defines a vertical scan rate and thus the number of rows in the projected image.

In accordance with the embodiments described herein, the speckle reduction component 108 is inserted into the optical path of the scanning laser projector 100 to reduce speckle in the projected image. In general, the speckle reduction component includes a polarizing beam splitter positioned between a first solid figure element and a second solid figure element. The first solid figure element is configured to receive the laser light beam and pass that the laser light beam to the polarizing beam splitter. The polarizing beam splitter passes a first portion of the laser light beam having P polarization to the second solid figure element, and reflects a second portion of the laser light beam having S polarization back to the first solid figure element. The first portion of the laser light beam received by the second solid figure element is internally reflected off at least three internal faces, and then outputted back to first solid figure element, where the first portion of light is spatially recombined with the second portion of laser light in the first solid figure element. The scanning mirror(s) 104 are configured to reflect the recombined laser light beam, and the drive circuit 106 is configured to provide an excitation signal to excite motion of the scanning mirror(s) 104. Specifically, the motion is excited such that the scanning mirror(s) 104 reflect the recombined laser light beam in the raster pattern 114 of scan lines to form a projected image In such embodiments, the splitting of the laser light into a first portion and a second portion, where the first portion is internally reflected off three internal faces of the second solid figure element before being spatially recombined with the first portion, generates a relative delay between the two portions. Specifically, the first portion of the laser light beam that reflects off at least three internal surfaces is temporally delayed relative to the second portion that reflects off the polarizing beam splitter. This relative delay between the portions of the laser light beam generates a temporal incoherence when the light beams are recombined. That temporal incoherence continues when the recombined light beams are scanned by scanning mirror(s) 104 into the raster pattern 114 to project an image.

This temporal incoherence in the recombined laser beams that are scanned to project an image results in reduced speckle in the projected image. Specifically, the temporal incoherence of the two recombined light beams, where the two recombined light beams have an orthogonal polarization orientation, effectively creates two uncorrelated speckle patterns in the projected image. These two uncorrelated speckle patterns partially average out and thus reduce the amount of speckle that is apparent to a viewer of the projected image.

Figure 2:
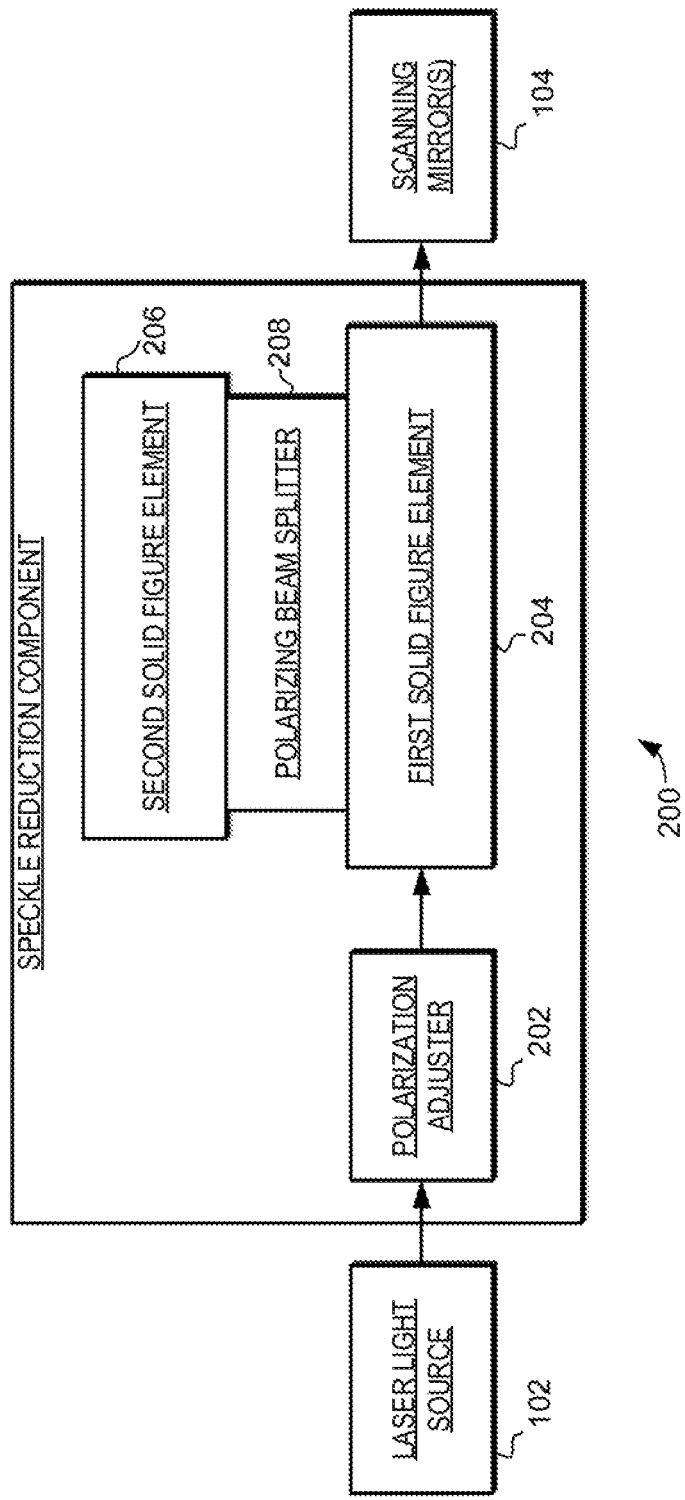
FIG. 2. shows a schematic view of a speckle reduction component in accordance with various embodiments of the present invention.

Turning now to FIG. 2, a more detailed embodiment of a speckle reduction component 200 is illustrated. The speckle reduction component 200 includes a polarization adjuster 202, a first solid figure element 204, a second solid figure element 206, and a polarizing beam splitter 208. Again, the speckle reduction component 200 is inserted into the optical path of a scanning laser projector to reduce speckle in the projected image. Specifically, the speckle reduction component 200 is configured to receive laser light from a laser light source 102 and output laser light to the scanning mirrors 104. When so configured, the speckle reduction component 200 will reduce speckle in the projected image.

It should be noted that while FIG. 2 shows the speckle reduction component receiving the laser light directly from the laser light source 102, that this is just one example embodiment. In other embodiments there can be additional optical elements inserted between the laser light source 102 and the speckle reduction component 200. Furthermore, there can be additional optical elements inserted between the speckle reduction component 200 and the scanning mirrors 104. Specific examples of such other elements will be discussed in greater detail below with reference to the detailed embodiments illustrated in FIGS. 4 and 5.

In general, the speckle reduction component 200 uses the polarization adjuster 202, the first solid figure element 204, the second solid figure element 206, and the polarizing beam splitter 208 to introduce a temporal incoherence in the laser light used to project the image, with that temporal incoherence implemented to reduce speckle in the projected image.

Specifically, in this embodiment the laser light source 102 provides a laser light beam, and the polarization adjuster 202 is configured to adjust the polarization of the laser light beam such that it includes power along two orthogonal polarization directions. As such, a variety of different types of devices and components can be used to implement the polarization adjuster 202. For example, both polarization converters and polarization rotators can be used to implement the polarization adjuster 202. Examples of polarization converters that can be used include quarter-wave plates and depolarizers. Examples of polarization rotators that can be used include half-wave plates and configurations that rotate the laser light source 102. In each case, such a polarization adjuster 202 can be implemented to provide the laser light beam with orthogonal polarization components. Furthermore, as will be described in greater detail below, it is generally desirable to implement the polarization adjuster 202 such that the resulting laser light beam has nearly equal optical power in two orthogonal polarization directions. For example, such that the laser light beam has S and P polarization components with half of the overall optical power in each component.

As noted above, in one example a quarter-wave plate can be used to implement the polarization adjuster 202. Specifically, a quarter-wave plate can be implemented to convert linear polarized light from the light source 102 to circularly polarized light, where circularly polarized light has orthogonal polarization components with substantially equal optical power. In general, a quarter-wave plate is fabricated to include different indices of refraction for different orientations of light. When linearly polarized light passes through a quarter-wave plate these different indices of refraction cause some polarizations to propagate slower than others. Specifically, to implement a quarter-wave plate, the indices of refraction and dimensions of the quarter-wave plate are selected to introduce a phase shift of 90 degrees ($\pi/2$ radians) between orthogonal polarizations. Such a configuration will cause linearly polarized light to be converted to circular polarized light and vice versa, and thus can be used as the polarization adjuster 202.

In another implementation, the polarization adjuster 202 can be implemented with a half-wave plate that is configured to rotate polarization by 45 degrees ($\pi/4$ radians) relative to the polarization direction of the polarizing beam splitter 208. Such an implementation is equivalent to the rotating the laser light source 102 relative to the polarization direction of polarizing beam splitter 208, and thus can be used to provide for the splitting of the laser light beam into components with nearly equal optical power based on the two orthogonal polarization directions.

In yet another implementation, the polarization adjuster 202 can be implemented with a polarizing element that divides the laser light beam power between two orthogonal polarizations. For example, a depolarizer such as a depolarizing filter or polarization scrambling device can be configured to scramble the polarization such that it includes two orthogonal polarization directions can be implemented as the polarization adjuster 202.

The first solid figure element 204 is configured to receive the laser light beam and pass that the laser light beam to the polarizing beam splitter 208. The polarizing beam splitter 208 splits the incoming laser light beam based on polarization, passing a first portion of the laser light beam having P polarization to the second solid figure element 206, and reflects a second portion of the laser light beam having S polarization back to the first solid figure element 204. The first portion of the laser light beam received by the second solid figure element 206 is internally reflected off at least three internal faces of the second solid figure element 206. After being internally reflected off at least three faces, the first portion of the laser light is outputted back to first solid figure element 204. At the first solid figure element 204, the first portion of light is spatially recombined with the second portion of laser light.

It should be noted that the polarizing beam splitter 208 preferably splits the incoming laser light beam into two portions with equal optical power. Stated another way, the polarizing beam splitter 208 allows approximately half the power to travel into the second solid figure element 206 while the other half of the power is immediately reflected back into the first solid figure element 204. This equal optical power splitting can improve the effectiveness of the speckle reduction by facilitating that the two generated speckle patterns will have approximately equal brightness and thus can more effectively average out and reduce the overall speckle of the projected image. Such an equal power split can be provided by having substantially equal power orthogonal polarization components in the laser light that is applied to the polarizing beam splitter 208. For example, using laser light having a circular polarization with substantially equal magnitude P and S polarization components will result in an equal optical power split at the polarizing beam splitter 208.

As noted above, the second solid figure element 206 is configured such that the first portion of laser light is reflected off at least three internal faces before exiting and recombining in with the second portion of laser light in the second solid figure element 206. As one example, this can be implemented with a second solid figure element 206 that comprises four faces. In such an implementation a first face of the four faces can be positioned adjacent to first solid figure element 204, while a second face, a third face and a fourth face of the four faces are configured to internally reflect the first portion of the laser light.

In such an embodiment, the second solid figure element 206 can comprise a polyhedron, such as a cubic polyhedron. In a cubic polyhedron embodiment, the four faces would each be of equal length, with equal angles between faces, and the first portion of light would reflect off three faces before reentering the first solid figure element 204 at the fourth face. Of course, this is just one example, and in other embodiments the second solid figure element 206 can be configured with more than four faces. For example, the second solid figure element 206 can be implemented with five or more faces. As more specific examples, the second solid figure element 206 can be implemented with 8 faces or 12 faces. In an 8 faced embodiment, the first portion of the laser light would internally reflect off 7 faces before reentering the first solid figure element 204 at the $8^{th}$ face. In such an embodiment, the 8 faces would have 135 degree angles between faces. In a 12 faced embodiment, the first portion of the laser light would internally reflect off 11 faces before reentering the first solid figure element 204 at the $12^{th}$ face. In such an embodiment, the 12 faces would have 150 degree angles between faces.

In all of these various embodiments, the relatively high number of internal reflections occurring in the second solid figure element 206 can facilitate a relatively large temporal delay to the first portion of the laser light relative to second portion of the laser light. Furthermore, this relatively large temporal delay can be provided in a relatively small device size. Specifically, providing reflection off at least three faces of the second solid figure element 206 can facilitate the needed temporal delay to effectively reduce speckle in the projected image while having relatively small dimensions. Thus, the embodiments described herein can provide effective speckle reduction in a compact and size effective speckle reduction component.

Furthermore, in all of these various embodiments, the relatively high number of internal reflections occurring in the second solid figure element 206 can facilitate relatively high optical power efficiency. It is generally desirable to implement the second solid figure element 206 in a way that reduces optical power loss, and thus improves overall optical power efficiency in the speckle reduction component 200. One way to reduce optical power loss is to increase the percentage of the first light portion that reflects around the second solid figure element 206 and is recombined with the first light portion in the first solid figure element 204. The embodiments described herein can reduce optical power loss and improve efficiency by using total internal reflection (TIR) to internally reflect the first light portion inside the second solid figure element 206. When TIR occurs, almost all the optical power is reflected, with only relatively small optical power losses occurring due to factors such as surface and material imperfections. Thus, using TIR in the second solid figure element 206 can reduce loss, and thus can improve optical power efficiency of the speckle reduction component 200.

In general, TIR occurs when the light is coming from more optically dense material (with a relatively high index of refraction n), is incident upon less optically dense material (with a relatively low index of refraction n), and the angle of incidence is sufficiently large. Specifically, to facilitate TIR in the second solid figure element 206, the angle of incidence at each internally reflected face must be greater than a critical angle $\theta_C$ (measured from a normal to the reflecting face) where the critical angle $\theta_C$ is defined as:

$$\theta_c = \arcsin\left(\frac{n_2}{n_1}\right)$$

where $n_1$ is the refractive index of the second solid figure element 206, and $n_2$ is the refractive index of the material outside the second solid figure element 206. As one specific example, the second solid figure element 206 is made of glass with a refractive index of $n_1$=1.52, the air outside the second solid figure element 206 has a refractive index of $n_2$=1.00, and thus the critical angle $\theta_C$ is approximately 41 degrees. Thus, in such an embodiment the angle of incidence at each reflecting face in the second solid figure element 206 must be greater than approximately 41 degrees to ensure TIR.

The embodiments described herein facilitate the use of TIR to provide relatively high optical power efficiency. Specifically, by including at least four faces in the second solid figure element 206, and reflecting the first portion of light off at least three faces, relatively high angles of incidence inside the second solid figure element 206 are provided. As one example, a second solid figure element 206 with four equal length faces can have angles of incidences of 45 degrees, significantly greater than the minimum required for a glass/air interface to have TIR. Likewise, a second solid figure element 206 with eight equal length faces can have angles of incidences of 67.5 degrees, again significantly greater than the minimum required for a glass/air interface to have TIR. Examples of such implementations will be discussed below with reference to FIGS. 3A-3D.

Furthermore, to facilitate TIR and reduce losses due to surface imperfections, it is generally desirable for each reflecting face to be polished or otherwise be processed to increase the smoothness of the reflecting face. In such embodiments any suitable technique for polishing the reflecting surface may be used.

It should be noted that while TIR is just one technique that can be used to provide internal reflection in the second solid figure element 206 that other techniques can be used. For example, ordinary reflection at each reflecting face can instead be facilitated with reflective coatings that can be applied using any suitable technique. However, such other techniques are likely to result in greater optical power loss compared to the use of TIR.

The first solid figure element 204 can likewise be implemented in a variety of shapes. In general, the first solid figure element 204 provides an input path to the polarizing beam splitter 208, and then provides for the recombining of the first and second portions of the laser beam. As one example shape that can be implemented to provide this, the first solid figure element 204 can be implemented in the shape of a prism. In such an embodiment, the first solid figure element 204 would have an input face and an output face, where the input face receives the laser light beam and the output face outputs the recombined laser light beam. In such an embodiment a third face of the first solid figure element 204 can provide the interface to the second solid figure element 206. As will be discussed in greater detail below, the polarizing beam splitter 208 can be implemented by applying one or more coatings to such a third face.

In general, the polarizing beam splitter 208 is implemented to split the incoming laser light into two portions, with the first portion passing to the second solid figure element 206, and the second portion reflecting back into the first solid figure element 204. Preferably, the polarizing beam splitter 208 is implemented in a way that provides an equal optical power split between light that is passed to the second solid figure element 206 and light that is reflected back into the first solid figure element 204. This can be accomplished by converting the incoming light to have S and P polarization components, and then implementing the polarizing beam splitter 208 to pass P polarized components and reflect S polarized components. Such a polarizing beam splitter 208 can be implemented by applying one or more coatings the first solid figure element 204 and/or the second solid figure element 206. For example, various dielectric coatings can be applied to the face(s) of these element(s) to implement the polarizing beam splitter 208, and then optical cement can be used to bond those elements together.

The first solid figure element 204 and the second solid figure element 206 are each implemented with materials that are transparent to the wavelengths provided by the laser light source 102. For example, the first solid figure element 204 and the second solid figure element 206 can be made from isotropic glass or isotropic plastic. Finally, various antireflective coatings can be applied to the input and output surfaces of the first solid figure element 204.

The splitting of the laser light into a first portion and a second portion by the polarizing beam splitter 208, where the first portion is internally reflected off three internal faces of the second solid figure element 206 before being spatially recombined with the first portion in the first solid figure element 204, generates a relative delay between the two portions. Specifically, the first portion of the laser light beam that reflects off at least three internal surfaces is temporally delayed relative to the second portion that reflects off the polarizing beam splitter. This relative delay between light beams generates a temporal incoherence when the light beams are recombined. That temporal incoherence continues when the recombined light beams are passed to the scanning mirrors 104 for scanning into the raster pattern to project an image.

This temporal incoherence in the recombined laser beams that are scanned to project an image results in reduced speckle in the projected image. Specifically, the temporal incoherence of two recombined light beams, where the light beams have orthogonal polarization components, effectively creates two speckle patterns, one for each of the two separated light beams. Because each of those two speckle patterns is essentially random and uncorrelated, when recombined the two speckle patterns will partially average out, reducing the amount of speckle that is apparent to a viewer of the projected image.

Specifically, in a typical embodiment such an implementation can reduce the apparent speckle by a factor of $\sqrt{2}$. This level of speckle reduction can be achieved when the first solid figure element 204 provides an approximately 50/50 optical power split and the relative delay between the two beams is at least equal or greater to the coherence length of the laser light. In general, the coherence length is the propagation distance over which a coherent wave maintains coherence. In one embodiment, with a light source having a Lorentz function distribution (as is common with laser diodes), such a coherence length $L_C$ is defined as:

$$L_c = \frac{\lambda^2}{\pi \Delta \lambda}$$

where $\lambda$ is the central wavelength of the laser light, and $\Delta \lambda$, is the full width half maximum (FWHM) spectral bandwidth of the laser light. Thus, in a typical embodiment, the first solid figure element 204 and the second solid figure element 206 are sized and otherwise configured to provide a relative delay that is at least equal to the coherence length $L_C$. For example, for a visible laser diode light source with a few nanometers of FWHM spectrum bandwidth, the coherence length would typically be on the order of a few 100 µm. Thus, a few millimeters of path difference provided in the second solid figure element 206 should generally be sufficient to break the coherence length of such a light source.

As was noted above, the various embodiments described herein can provide such a temporal delay in a relatively compact structure and with relatively high power efficiency. Specifically, the relatively high number of internal reflections occurring in the second solid figure element 206 can facilitate a temporal delay that is both large relative to the size of the device and with relatively low optical power losses. Thus, the embodiments described herein can provide effective speckle reduction in a compact and size effective speckle reduction component with high power efficiency.

Turning now to FIG. 3A, a top view of a specific implementation of a speckle reduction component 300 is illustrated. In this illustrated implementation, the speckle reduction component 300 includes a polarization adjuster 302, a first solid figure element 304, a second solid figure element 306, and a polarizing beam splitter 308. The speckle reduction component 300 is an example of the type of device that can be inserted into the optical path of a scanning laser projector to reduce speckle in the projected image. In such an application the speckle reduction component 300 is configured to receive laser light from a laser light source and output laser light to one or more scanning mirrors. When so implemented, the speckle reduction component 300 will reduce speckle in the projected image and thus provide for improved image quality.

In general, the speckle reduction component 300 uses the polarization adjuster 302, the first solid figure element 304, the second solid figure element 306, and the polarizing beam splitter 308 to introduce a temporal incoherence in the laser light used to project the image, with that temporal incoherence implemented to reduce speckle in the projected image.

Specifically, in this illustrated embodiment a laser light source (not shown in FIG. 3A) provides a laser light beam, and the polarization adjuster 302 is configured to convert the laser light beam to have equal optical power orthogonal polarization components. As one specific example, the polarization adjuster 302 comprises a quarter-wave plate configured to convert linearly polarized light to circularly polarized light, where circular polarized light has substantially equal S and P polarization components that are out of phase.

In the specific embodiment of FIG. 3A, the first solid figure element 304 comprises a prism element, the second solid figure element 306 comprises a polyhedron element, and the polarizing beam splitter 308 comprises a coating applied between the first solid figure element 304 and the second solid figure element 306. Thus, during operation, the polarized light beam impacts the first solid figure element 304 at an input surface 310. In this illustrated embodiment, the polarized light beam is perpendicular to the input surface 310, and thus passes into the first solid figure element 304 without significant reflection. The polarized light beam propagates through the first solid figure element 304 until it impacts the polarizing beam splitter 308. At the polarizing beam splitter 308, the light of one polarization component (i.e., the P polarization component) passes through to the second solid figure element 306, while the light of the other polarization component (i.e., the S polarization component) is reflected back into the first solid figure element 304.

Inside the second solid figure element 306, the P polarization component continues and passes through the second solid figure element 306 until it impacts the face 312. At the face 312, the P polarization component internally reflects to the face 314, where it reflects again to face 316, where it reflects for a final time and continues back to the polarizing beam splitter 308. In this embodiment, the path taken by the P polarization component as it reflects off the faces 312, 314 and 316 introduces a delay to the P polarization component of the laser light.

This temporally delayed portion of the laser light exits the second solid figure element 306 and again crosses the polarizing beam splitter 308 and reenters the first solid figure element 304. After reentering the first solid figure element 304, the P polarization component of the laser light spatially recombines with the S polarization component of the laser light that was reflected by the polarizing beam splitter 308. This recombined laser light beam passes through the first solid figure element 304 until it exits at the output face 318. It should be noted that this in this embodiment, the recombined laser light beam exits at a perpendicular angle to the output face 318.

Notably, the P polarization component travels along a path that is significantly longer than the S polarization component before exiting the first solid figure element 204. This longer path length is facilitated by the shape of the second solid figure element 306 and the internal reflection that occurs inside the second solid figure element 306. Because of this longer path, the P polarization light beam will be delayed in time relative to the S polarization light beam when recombined at the output surface. This generates a temporal incoherence in the recombined light beam, and that temporal incoherence continues when the recombined light beam is scanned to project an image. Furthermore, because the P polarization light beam and the S polarization light beam have orthogonal polarization orientation, that temporal incoherence in the recombined light beam will result in two uncorrelated speckle patterns in the projected image. These two uncorrelated speckle patterns will partially average out and thus reduce the amount of speckle that is apparent to a viewer of the projected image.

Furthermore, the embodiment illustrated in FIG. 3A can provide such a speckle reduction in a relatively compact device. Specifically, by reflecting three times off the internal faces of the second solid figure element 306, a relatively large temporal delay is provided in a second solid figure element 306 that is relatively compact. Furthermore, by reflecting three times off the internal faces the second solid figure element 306 facilitates internal angles of incidences of 45 degrees, significantly greater than the minimum required for a typical glass/air interface to have total internal reflection (TIR). Thus, this embodiment can provide effective speckle reduction in a compact and size effective speckle reduction component, and with relatively low optical power losses.

Figure 3B:
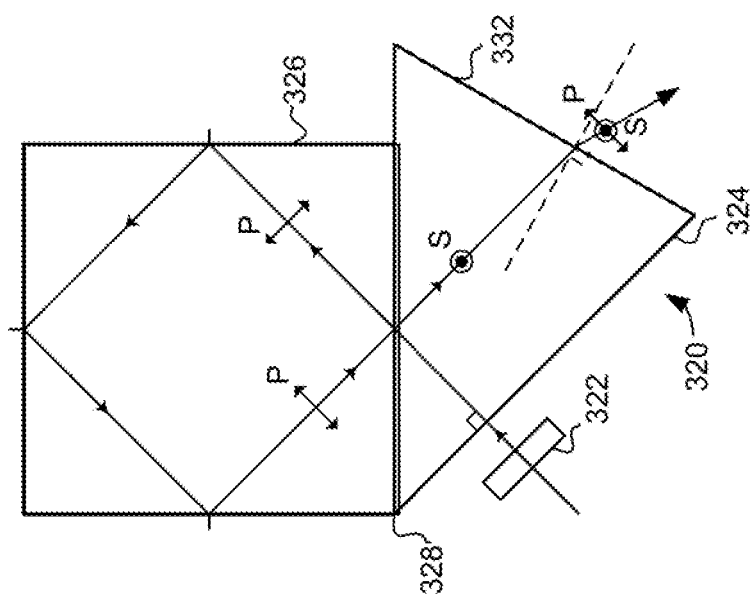

Turning now to FIG. 3B, a top view of another specific implementation of a speckle reduction component 320 is illustrated. This embodiment is similar to that illustrated in FIG. 3A, but can also be implemented to provide spatial shaping of the laser light beam.

It should be first noted that many commonly used laser light sources produce beams with non-circular spatial distributions. For example, many laser diodes produce laser light beams with elliptical (but non-circular) spatial distribution, and such a spatial distribution is not ideal for many scanning laser projectors. For these reasons, it can be desirable to provide a mechanism for spatially shaping the laser light beam in a way that makes the laser light beam more circularized.

In this illustrated implementation, the speckle reduction component 320 includes a polarization adjuster 322, a first solid figure element 324, a second solid figure element 326, and a polarizing beam splitter 308. Again, the speckle reduction component 330 is an example of the type of device that can be inserted into the optical path of a scanning laser projector to reduce speckle in the projected image.

The major difference in the embodiment of FIG. 3B is the shape of the first solid figure element 324. Specifically, in this illustrated embodiment, the first solid figure element 324 has unbalanced dimensions implemented to shape the recombined laser light beam. Specifically, the shape of the first solid FIG. 324 is such that the recombined output laser light beam exits the output surface 332 at a non-orthogonal angle. Exiting the output surface 332 at a non-orthogonal angle causes refraction, which compresses the existing spatial distribution of the laser light beam. This compression of the spatial distribution of the laser light beam can be used to provide beam circularization. Specifically, the compression can be used to circularize a laser light beam that otherwise would have a non-circular elliptical spatial distribution, and can thus shape of the laser light beam for more effective use in the scanning laser projector. Thus, the speckle reduction component 320 can provide both speckle reduction and beam circularization in one relatively compact device.

Figure 3C:
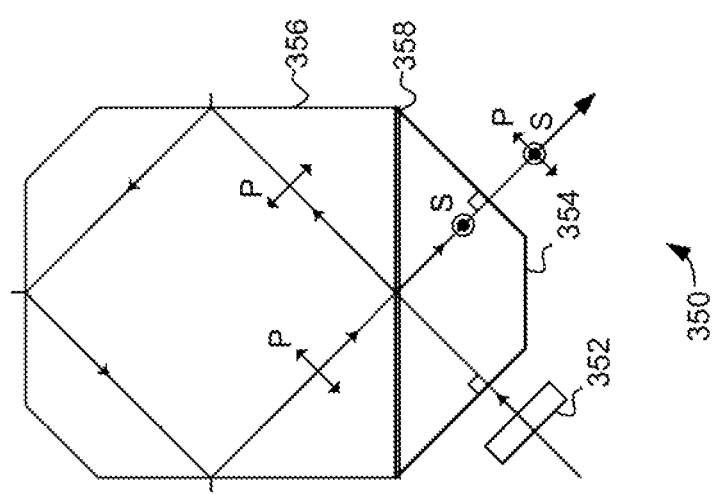

Turning now to FIG. 3C, a top view of another specific implementation of a speckle reduction component 350 is illustrated. In this illustrated implementation, the speckle reduction component 350 includes a polarization adjuster 352, a first solid figure element 354, a second solid figure element 356, and a polarizing beam splitter 358. Again, the speckle reduction component 350 is an example of the type of device that can be inserted into the optical path of a scanning laser projector to reduce speckle in the projected image.

As with the embodiments of FIGS. 3A and 3B, the embodiment shown in FIG. 3C users internal reflection of the laser light beam in the second solid figure element 356 to introduce a delay in that portion of the laser light beam. When such a delay is large enough, the delay will cause a temporal incoherence in the laser light used to project the image, with that temporal incoherence provided to reduce speckle in the projected image.

In FIG. 3C, the shape of the first solid figure element 354 and the second solid figure element 356 are different than those illustrated in FIG. 3A. Specifically, instead of a pure prism and a pure cubic shape respectively, these elements have "cut off corners" at various locations. These cut off corners show how exterior shape of the solid figure elements can be changed while still providing speckle reduction. Specifically, in FIG. 3C the number of faces determines the internal reflection and resulting path length for the first portion of the laser light. Thus, the temporal incoherence is provided even if the first solid figure element 354 is not a pure prism or if the second solid figure element 356 is not a pure cubic. Instead, the number and configurations of faces used to reflect the first portion of light and the resulting amount of introduced delay determines the temporal incoherence that is provided by speckle reduction component.

Again, the introduced delay generates a temporal incoherence in the recombined light beam, and that temporal incoherence continues when the recombined light beam is scanned to project an image. The resulting final temporal incoherence of light beams having an orthogonal polarization orientation effectively creates two speckle patterns in the projected image, and because each of those two speckle patterns are uncorrelated, the two speckle patterns will partially average out, reducing the amount of speckle that is apparent to a viewer of the projected image.

Figure 3D:
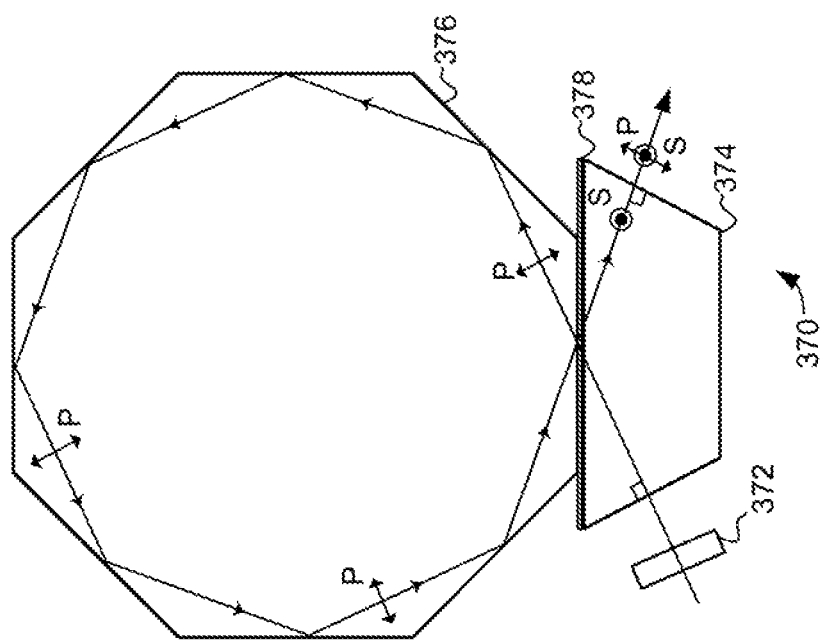

Turning now to FIG. 3D, a top view of another specific implementation of a speckle reduction component 370 is illustrated. In this illustrated implementation, the speckle reduction component 370 includes a polarization adjuster 372, a first solid figure element 374, a second solid figure element 376, and a polarizing beam splitter 378.

In general, the speckle reduction component 370 uses the polarization adjuster 372, the first solid figure element 374, the second solid figure element 376, and the polarizing beam splitter 378 to introduce a temporal incoherence in the laser light used to project the image, with that temporal incoherence implemented to reduce speckle in the projected image.

In the specific embodiment of FIG. 3D, the second solid figure element 376 has 8 faces, and the first portion of light (having P polarization) internally reflects off 7 of those eight faces before reentering the first solid figure element 374 and being recombined with the second portion of light (having S polarization). By reflecting off 7 faces, the relative path difference is increased and thus, compared to the embodiments of FIG. 3A, the speckle reduction component 370 can provide an even greater relative temporal delay. Furthermore, increasing the number of faces increases the angle of incidence at each face, and such an increase in the angle of incidence can increase the percentage of light reflected at each face, and thus can facilitate the providing of total internal reflection inside the second solid figure element 376.

Again, such a temporal delay generates a temporal incoherence in the recombined light beam, and that temporal incoherence continues when the recombined light beam is scanned to project an image. This temporal incoherence effectively creates two speckle patterns in the projected image, reducing the amount of speckle that is apparent to a viewer of the projected image. Furthermore, the embodiment illustrated in FIG. 3D can provide such a speckle reduction in a relatively compact device and high power efficiency. Specifically, by reflecting seven times off the internal faces of the second solid figure element 376, a relatively large temporal delay is provided in a second solid figure element 376. Additionally, by reflecting seven times off the internal faces of the second solid figure element 376, relatively large angles of incidences of 67.5 degrees are provided, thus facilitating total internal reflection (TIR) and low optical power losses.

Figure 4:
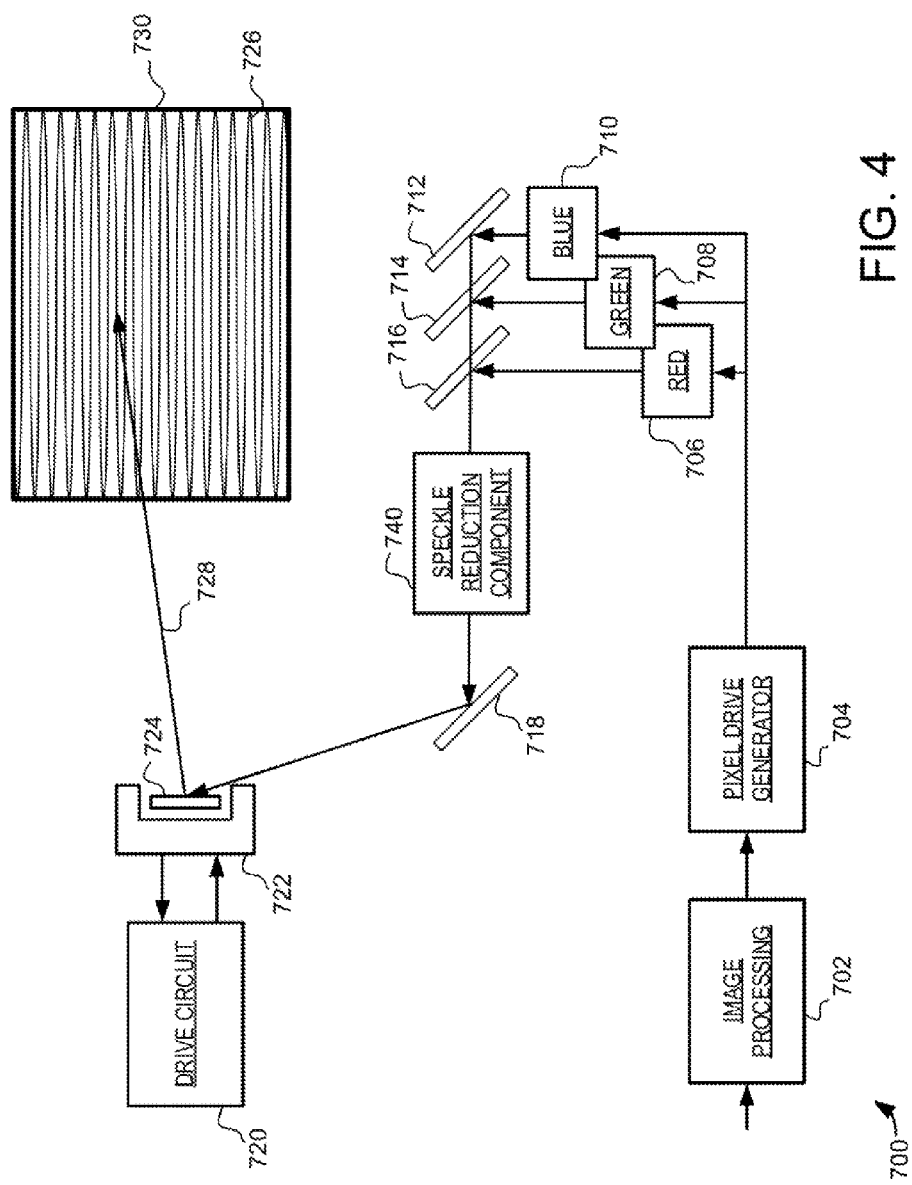
FIG. 4 shows a schematic view of a scanning laser projector in accordance with various embodiments of the present invention.

Turning now to FIG. 4, a schematic view of a scanning laser projector 700 is illustrated. The scanning laser projector 700 is a more detailed example of the type of system that can be used in accordance with various embodiments of the present invention. Scanning laser projector 700 includes an image processing component 702, a pixel drive generator 704, a red laser module 706, a green laser module 708, and a blue laser module 710. Light from the three laser modules is combined with dichroics 712, 714, and 716. Scanning laser projector 700 also includes fold mirror 718, drive circuit 720, and MEMS device 722 with scanning mirror 724.

In operation, image processing component 702 processes video content at using two dimensional interpolation algorithms to determine the appropriate spatial image content for each scan position at which an output pixel is to be displayed by the pixel drive generator. For example, the video content may represent a grid of pixels at any resolution (e.g., 640×480, 848×480, 1280×720, 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto an ultra-high speed gimbal mounted 2 dimensional bi-axial laser scanning mirror 724. In some embodiments, this bi-axial scanning mirror is fabricated from silicon using MEMS processes. The vertical axis of rotation is operated quasi-statically and creates a vertical sawtooth raster trajectory. The vertical axis is also referred to as the slow-scan axis. The horizontal axis is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

The horizontal resonant axis is also referred to as the fast-scan axis. In some embodiments, raster pattern 726 is formed by combining a sinusoidal component on the horizontal axis and a sawtooth component on the vertical axis. In these embodiments, output beam 728 sweeps back and forth left-to-right in a sinusoidal pattern, and sweeps vertically (top-to-bottom) in a sawtooth pattern with the display blanked during flyback (bottom-to-top).

Figure 7:
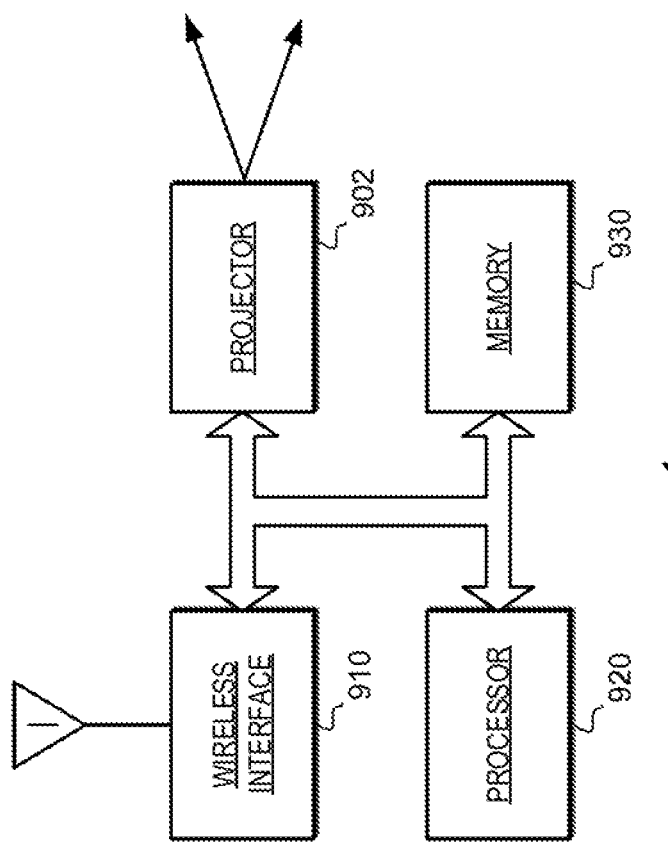
FIG. 7 shows a block diagram of a mobile device in accordance with various embodiments of the present invention.

It should be noted that FIG. 7 illustrates the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern 726.

The drive circuit 720 provides a drive signal to MEMS device 722. The drive signal includes an excitation signal to control the resonant angular motion of scanning mirror 724 on the fast-scan axis, and also includes slow scan drive signal to cause deflection on the slow-scan axis. The resulting mirror deflection on both the fast and slow-scan axes causes output beam 728 to generate a raster scan 726 in an image region 730. In operation, the laser light sources produce light pulses for each output pixel and scanning mirror 724 reflects the light pulses as beam 728 traverses the raster pattern 726. Drive circuit 720 also receives a feedback signal from MEMS device 722. The feedback signal from the MEMS device 722 can describe the maximum deflection angle of the mirror, also referred to herein as the amplitude of the feedback signal. This feedback signal is provided to the drive circuit 720, and is used by the drive circuit 720 to accurately control the motion of the scanning mirror 724.

In operation, drive circuit 720 excites resonant motion of scanning mirror 724 such that the amplitude of the feedback signal is constant. This provides for a constant maximum angular deflection on the fast-scan axis as shown in raster pattern 726. The excitation signal used to excite resonant motion of scanning mirror 724 can include both amplitude and a phase. Drive circuit 720 includes feedback circuit(s) that modifies the excitation signal amplitude to keep the feedback signal amplitude substantially constant. Additionally, the drive circuit 720 can modify the excitation signal to control the horizontal phase alignment and vertical position of the raster pattern 726.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 4 illustrates an embodiment with a single MEMS device 722 and a single scanning mirror 724, that this is just one example implementation. As another example, a scanning laser projector could instead be implemented with scanning mirror assembly that includes two scanning mirrors, with one mirror configured to deflect along one axis and another mirror configured to deflect along a second axis that is largely perpendicular to the first axis.

Such an embodiment could include a second MEMS device, a second scanning mirror, and a second drive circuit. The first scanning mirror could be configured to generate horizontal scanning motion, and the second scanning mirror configured to generate vertical motion. Thus, the motion of one scanning mirror determines the horizontal scan amplitude and the motion of the other scanning mirror determines the vertical scan amplitude.

Finally, although red, green, and blue laser light sources are shown in FIG. 7A, the various embodiments are not limited by the wavelength of light emitted by the laser light sources. For example, in some embodiments, non-visible light (e.g., infrared light) is emitted instead of, or in addition to, visible light.

In accordance with the embodiments described herein, a speckle reduction component 740 is inserted into the optical path. The speckle reduction component can be implemented with any of the various embodiments described above. As such, the speckle reduction component 740 uses solid figure elements to reduce speckle in the projected image generated by the scanning laser projector 700. Specifically, the speckle reduction component 740 uses a first solid figure element and a second solid figure element as described with reference to the various embodiments above. The speckle reduction component 740 is configured to receive laser light from the laser modules 706, 708, and 710, and separate the laser light into two components with different relative delays. This relative delay introduces a temporal incoherence in the recombined light beams, and that temporal incoherence results in reduced speckle in the projected image.

It should be noted that in this embodiment the speckle reduction component 740 operates on the laser light after the laser light of different colors (from red laser module 706, a green laser module 708, and a blue laser module 710) have been combined with the dichroics 712, 714, and 716. However, this is just one example, and other embodiments are possible.

Figure 5:
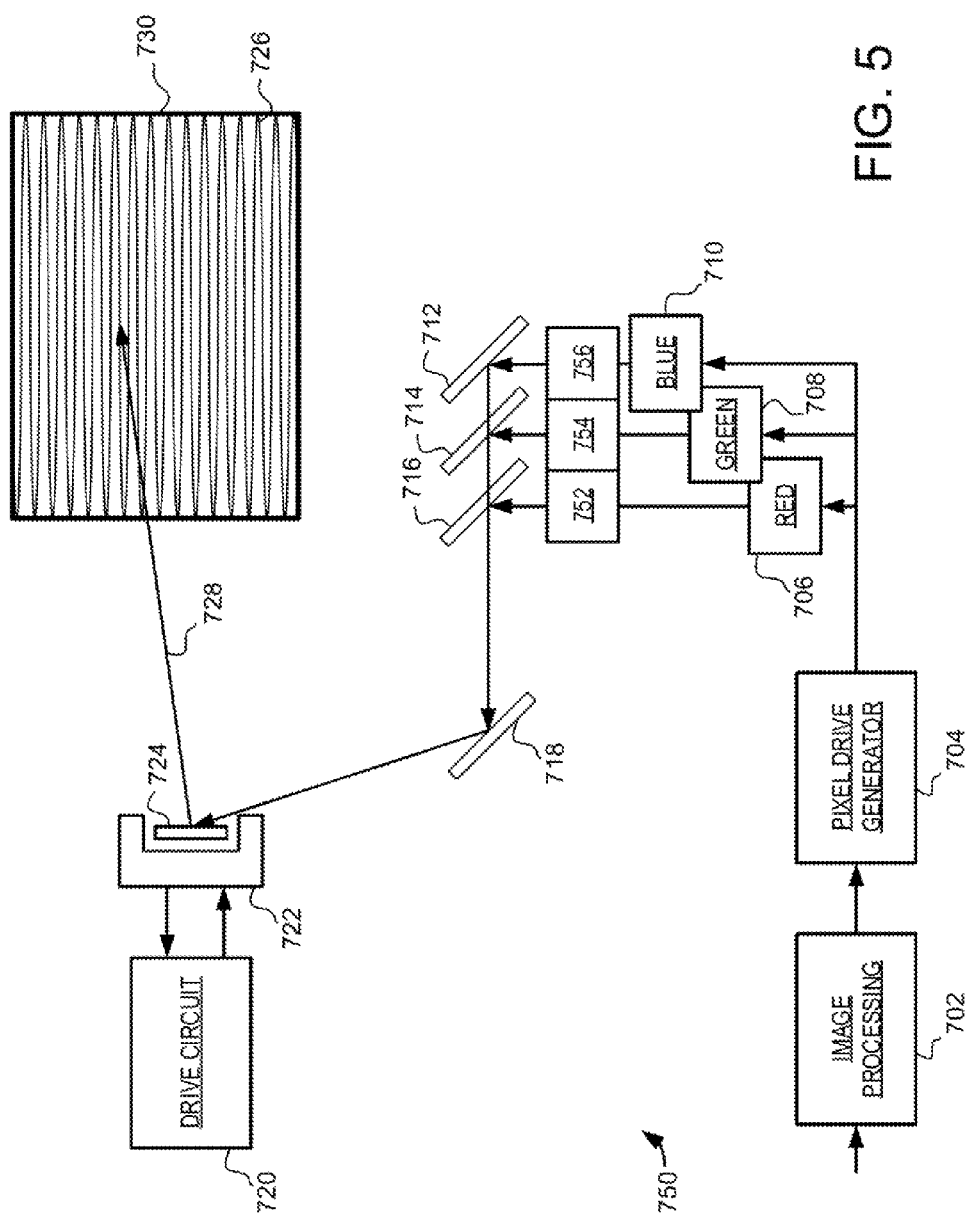
FIG. 5 shows a schematic view of a scanning laser projector in accordance with various embodiments of the present invention.

For example, turning now to FIG. 5, a second schematic view of a scanning laser projector 700 is illustrated. The scanning laser projector 750 is another example of the type of system that can be used in accordance with various embodiments of the present invention. Scanning laser projector 750 is similar to that of projector 700 illustrated in FIG. 4, but instead uses three separate speckle reduction components 752, 754 and 756. Specifically, the scanning laser projector 750 uses separate speckle reduction components 752, 754 and 756, with one for each color laser outputted by the red laser module 706, a green laser module 708, and a blue laser module 710. Again, this is just one example of how such speckle reduction components can be implemented into a scanning laser projector.

Figure 6:
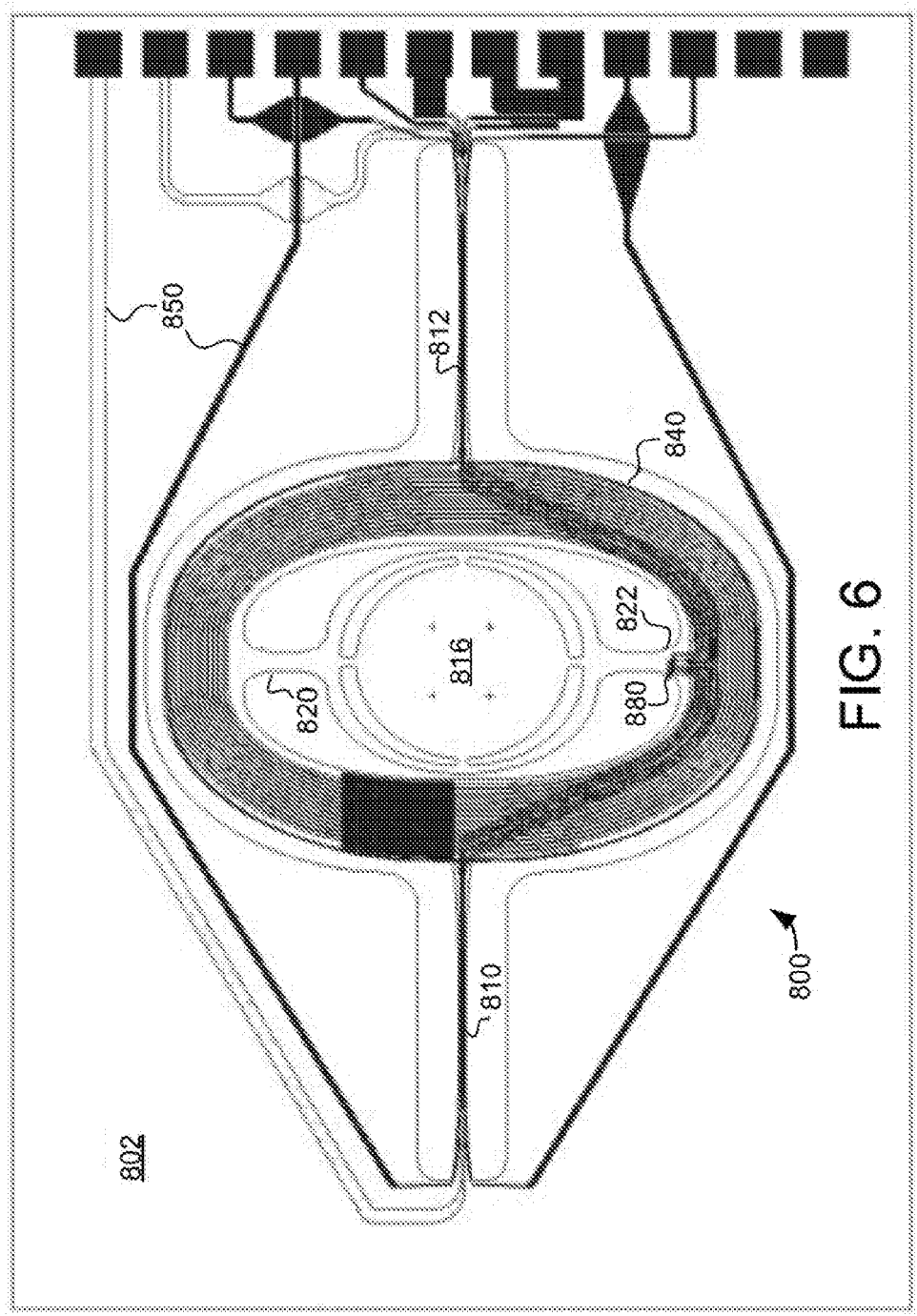
FIG. 6 shows a plan view of a microelectromechanical system (MEMS) device with a scanning mirror in accordance with various embodiments of the present invention.

Turning now to FIG. 6, a plan view of a microelectromechanical system (MEMS) device with a scanning mirror is illustrated. MEMS device 800 includes fixed platform 802, scanning platform 840, and scanning mirror 816. Scanning platform 840 is coupled to fixed platform 802 by flexures 810 and 812, and scanning mirror 16 is coupled to scanning platform 840 by flexures 820 and 822. Scanning platform 840 has a drive coil connected to drive lines 850, which are driven by a drive signal provided from a drive circuit (e.g., drive circuit 720). The drive signal includes an excitation signal to excite resonant motion of scanning mirror 816 on the fast-scan axis, and also includes a slow-scan drive signal to cause non-resonant motion of scanning platform 840 on the slow-scan axis. Current drive into drive lines 850 produces a current in the drive coil. In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 840, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 810 and 812 form a pivot axis. Flexures 810 and 812 are flexible members that undergo a torsional flexure, thereby allowing scanning platform 840 to rotate on the pivot axis and have an angular displacement relative to fixed platform 802. Flexures 810 and 812 are not limited to torsional embodiments as shown in FIG. 6. For example, in some embodiments, flexures 810 and 812 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 816 pivots on a first axis formed by flexures 820 and 822, and pivots on a second axis formed by flexures 810 and 812. The first axis is referred to herein as the horizontal axis or fast-scan axis, and the second axis is referred to herein as the vertical axis or slow-scan axis. In some embodiments, scanning mirror 816 scans at a mechanically resonant frequency on the horizontal axis resulting in a sinusoidal horizontal sweep. Further, in some embodiments, scanning mirror 816 scans vertically at a nonresonant frequency, so the vertical scan frequency can be controlled independently.

In a typical embodiment the MEMS device 800 will also incorporates one or more integrated piezoresistive position sensors. For example, piezoresistive sensor 880 can be configured to produces a voltage that represents the displacement of mirror 816 with respect to scanning platform 840, and this voltage can be provided back to the drive circuit. Furthermore, in some embodiments, positions sensors are provided on one scan axis while in other embodiments position sensors are provided for both axes.

It should be noted that the MEMS device 800 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 800 uses a drive coil on a moving platform with a static magnetic field, other embodiments may include a magnet on a moving platform with drive coil on a fixed platform. Further, the mirror drive mechanism may include an electrostatic drive mechanism.

The scanning laser projectors described above (e.g., scanning laser projector 100 of FIG. 1) can be implemented in a wide variety of devices and for a wide variety of applications. Several specific examples of these types of devices will not be discussed with reference to FIGS. 7-12. In each case, the various embodiments described above can be implemented with or as part of such a device.

Turning to FIG. 7, a block diagram of a mobile device 900 in accordance with various embodiments is illustrated. Specifically, mobile device 900 is an example of the type of device in which a scanning laser projector as described above can be implemented (e.g., scanning laser projector 100, scanning laser projector 700). As shown in FIG. 7, mobile device 900 includes wireless interface 910, processor 920, memory 930, and scanning laser projector 902. Scanning laser projector 902 includes photodetector(s) configured in an over scanned region signal to provide feedback signal(s) as described above. Scanning laser projector 902 may receive image data from any image source.

For example, in some embodiments, scanning laser projector 902 includes memory that holds still images. In other embodiments, scanning laser projector 902 includes memory that includes video images. In still further embodiments, scanning laser projector 902 displays imagery received from external sources such as connectors, wireless interface 910, a wired interface, or the like.

Wireless interface 910 may include any wireless transmission and/or reception capabilities. For example, in some embodiments, wireless interface 910 includes a network interface card (NIC) capable of communicating over a wireless network. Also for example, in some embodiments, wireless interface 910 may include cellular telephone capabilities. In still further embodiments, wireless interface 910 may include a global positioning system (GPS) receiver. One skilled in the art will understand that wireless interface 910 may include any type of wireless communications capability without departing from the scope of the present invention.

Processor 920 may be any type of processor capable of communicating with the various components in mobile device 900. For example, processor 920 may be an embedded processor available from application specific integrated circuit (ASIC) vendors, or may be a commercially available microprocessor. In some embodiments, processor 920 provides image or video data to scanning laser projector 100. The image or video data may be retrieved from wireless interface 910 or may be derived from data retrieved from wireless interface 910. For example, through processor 920, scanning laser projector 902 may display images or video received directly from wireless interface 910. Also for example, processor 920 may provide overlays to add to images and/or video received from wireless interface 910, or may alter stored imagery based on data received from wireless interface 910 (e.g., modifying a map display in GPS embodiments in which wireless interface 910 provides location coordinates).

Figure 8:
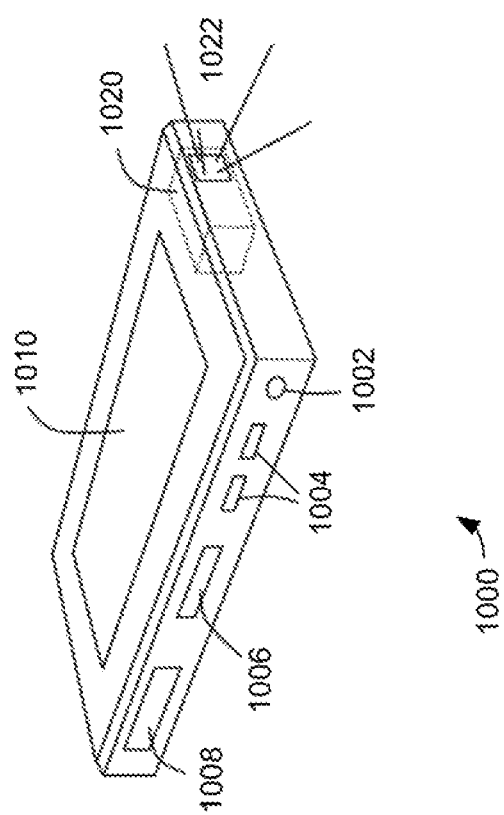
FIG. 8 shows a perspective view of a mobile device in accordance with various embodiments of the present invention.

Turning to FIG. 8, a perspective view of a mobile device 1000 in accordance with various embodiments is illustrated. Specifically, mobile device 1000 is an example of the type of device in which a scanning laser projector as described above can be implemented (e.g., scanning laser projector 100, scanning laser projector 700). Mobile device 1000 may be a hand held scanning laser projector with or without communications ability. For example, in some embodiments, mobile device 1000 may be a scanning laser projector with little or no other capabilities. Also for example, in some embodiments, mobile device 1000 may be a device usable for communications, including for example, a cellular phone, a smart phone, a tablet computing device, a global positioning system (GPS) receiver, or the like. Further, mobile device 1000 may be connected to a larger network via a wireless (e.g., cellular), or this device can accept and/or transmit data messages or video content via an unregulated spectrum (e.g., WiFi) connection.

Mobile device 1000 includes scanning laser projector 1020, touch sensitive display 1010, audio port 1002, control buttons 1004, card slot 1006, and audio/video (A/V) port 1008. None of these elements are essential. For example, mobile device may only include scanning laser projector 1020 without any of touch sensitive display 1010, audio port 1002, control buttons 1004, card slot 1006, or A/V port 1008. Some embodiments include a subset of these elements. For example, an accessory projector may include scanning laser projector 1020, control buttons 1004 and A/V port 1008. A smartphone embodiment may combine touch sensitive display device 1010 and projector 1020.

Touch sensitive display 1010 may be any type of display. For example, in some embodiments, touch sensitive display 1010 includes a liquid crystal display (LCD) screen. In some embodiments, display 1010 is not touch sensitive. Display 1010 may or may not always display the image projected by scanning laser projector 1020. For example, an accessory product may always display the projected image on display 1010, whereas a mobile phone embodiment may project a video while displaying different content on display 1010. Some embodiments may include a keypad in addition to touch sensitive display 1010. A/V port 1008 accepts and/or transmits video and/or audio signals. For example, A/V port 1008 may be a digital port, such as a high definition multimedia interface (HDMI) interface that accepts a cable suitable to carry digital audio and video data. Further, A/V port 1008 may include RCA jacks to accept or transmit composite inputs. Still further, A/V port 1008 may include a VGA connector to accept or transmit analog video signals.

In some embodiments, mobile device 1000 may be tethered to an external signal source through A/V port 1008, and mobile device 1000 may project content accepted through A/V port 1008. In other embodiments, mobile device 1000 may be an originator of content, and A/V port 1008 is used to transmit content to a different device.

Audio port 1002 provides audio signals. For example, in some embodiments, mobile device 1000 is a media recorder that can record and play audio and video. In these embodiments, the video may be projected by scanning laser projector 1020 and the audio may be output at audio port 1002.

Mobile device 1000 also includes card slot 1006. In some embodiments, a memory card inserted in card slot 1006 may provide a source for audio to be output at audio port 1002 and/or video data to be projected by scanning laser projector 1020. Card slot 1006 may receive any type of solid state memory device, including for example secure digital (SD) memory cards.

Figure 9:
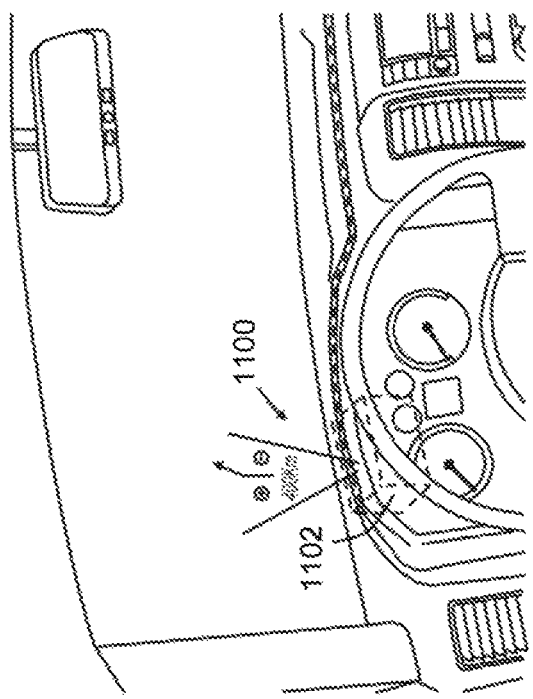
FIG. 9 shows a perspective view of a head-up display system in accordance with various embodiments of the present invention.
Figure 11:
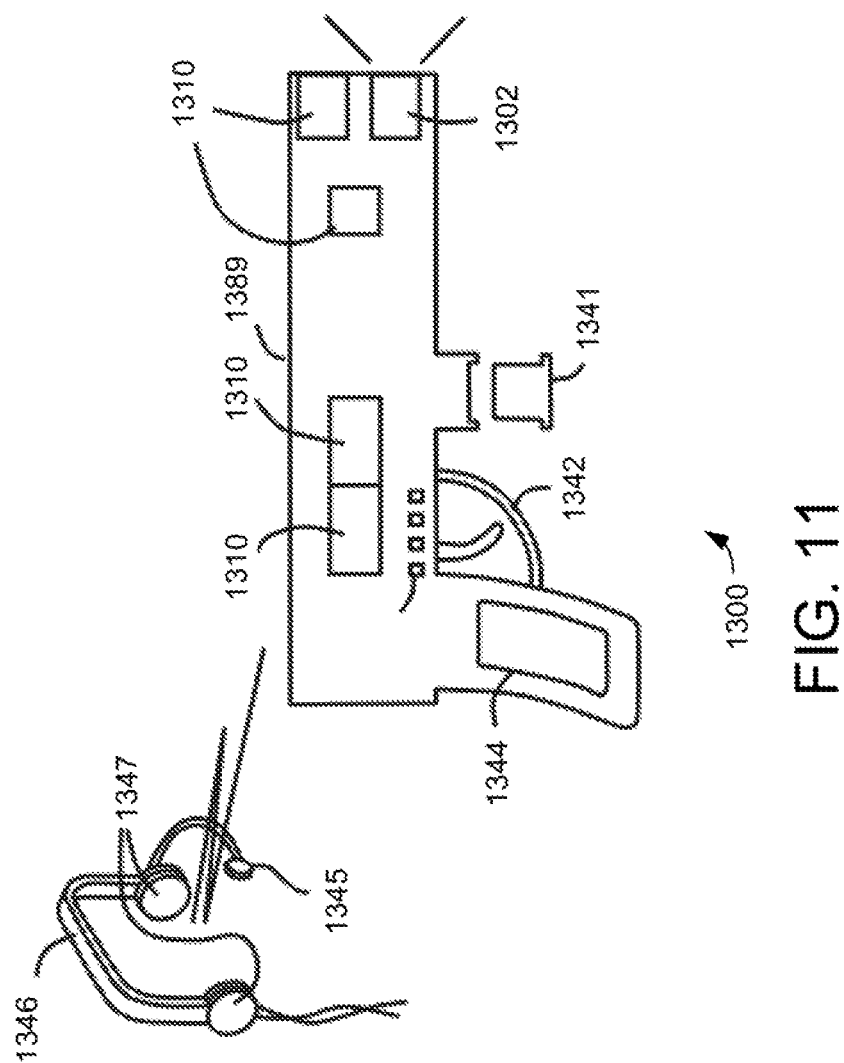
FIG. 11 shows a perspective view of a gaming apparatus in accordance with various embodiments of the present invention.

Turning to FIG. 9, a perspective view of a head-up display system 1100 in accordance with various embodiments is illustrated. Specifically, head-up display system 1100 is an example of the type of device in which a scanning laser projector as described above can be implemented (e.g., scanning laser projector 100, scanning laser projector 700). The head-up display system 1100 includes a scanning laser projector 1102. Specifically, the scanning laser projector 1102 is shown mounted in a vehicle dash to project the head-up display. Although an automotive head-up display is shown in FIG. 9, this is not a limitation and other applications are possible. For example, various embodiments include head-up displays in avionics application, air traffic control applications, and other applications.

Figure 10:
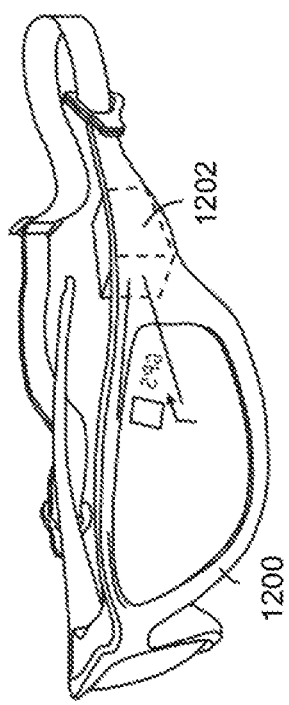
FIG. 10 shows a perspective view of eyewear in accordance with various embodiments of the present invention.

Turning to FIG. 10, a perspective view of eyewear 1200 in accordance with various embodiments is illustrated. Specifically, eyewear 1200 is an example of the type of device in which a scanning laser projector as described above can be implemented (e.g., scanning laser projector 100, scanning laser projector 700). Eyewear 1200 includes scanning laser projector 1202 to project a display in the eyewear's field of view. In some embodiments, eyewear 1200 is see-through and in other embodiments, eyewear 1200 is opaque. For example, eyewear 1200 may be used in an augmented reality application in which a wearer can see the display from projector 1202 overlaid on the physical world. Also for example, eyewear 1200 may be used in a virtual reality application, in which a wearer's entire view is generated by projector 1202.

Although only one projector 1202 is shown in FIG. 10, this is not a limitation and other implementations are possible. For example, in some embodiments, eyewear 1200 includes two projectors 1202, with one for each eye Turning to FIG. 11, a perspective view of a gaming apparatus 1300 in accordance with various embodiments is illustrated. Gaming apparatus 1300 allows a user or users to observe and interact with a gaming environment. In some embodiments, the game is navigated based on the motion, position, or orientation of gaming apparatus 1300, an apparatus that includes scanning laser projector 1302. Other control interfaces, such as manually-operated buttons, foot pedals, or verbal commands, may also contribute to navigation around, or interaction with the gaming environment. For example, in some embodiments, trigger 1342 contributes to the illusion that the user or users are in a first person perspective video game environment, commonly known as a "first person shooter game." Because the size and brightness of the projected display can be controlled by the gaming application in combination with the user's movement, gaming apparatus 1300 creates a highly believable or "immersive" environment for these users.

Many other first person perspective simulations can also be created by gaming apparatus 1300, for such activities as 3D seismic geo-prospecting, spacewalk planning, jungle canopy exploration, automobile safety instruction, medical education, etc. Tactile interface 1344 may provide a variety of output signals, such as recoil, vibration, shake, rumble, etc. Tactile interface 1344 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1300 may also include audio output devices, such as integrated audio speakers, remote speakers, or headphones. These sorts of audio output devices may be connected to gaming apparatus 1300 with wires or through a wireless technology. For example, wireless headphones 1346 provide the user with sound effects via a BLUETOOTH™ connection, although any sort of similar wireless technology could be substituted freely. In some embodiments, wireless headphones 1346 may include microphone 1345 or binaural microphone 1347, to allow multiple users, instructors, or observers to communicate. Binaural microphone 1347 typically includes microphones on each ear piece, to capture sounds modified by the user's head shadow. This feature may be used for binaural hearing and sound localization by other simulation participants.

Gaming apparatus 1300 may include any number of sensors 1310 that measure ambient brightness, motion, position, orientation, and the like. For example, gaming apparatus 1300 may detect absolute heading with a digital compass, and detect relative motion with an x-y-z gyroscope or accelerometer. In some embodiments, gaming apparatus 1300 also includes a second accelerometer or gyroscope to detect the relative orientation of the device, or its rapid acceleration or deceleration. In other embodiments, gaming apparatus 1300 may include a Global Positioning Satellite (GPS) sensor, to detect absolute position as the user travels in terrestrial space.

Gaming apparatus 1300 may include battery 1341 and/or diagnostic lights 1343. For example, battery 1341 may be a rechargeable battery, and diagnostic lights 1343 could indicate the current charge of the battery. In another example, battery 1341 may be a removable battery clip, and gaming apparatus 1300 may have an additional battery, electrical capacitor or super-capacitor to allow for continued operation of the apparatus while the discharged battery is replaced with a charged battery. In other embodiments, diagnostic lights 1343 can inform the user or a service technician about the status of the electronic components included within or connected to this device. For example, diagnostic lights 1343 may indicate the strength of a received wireless signal, or the presence or absence of a memory card.

Diagnostic lights 1343 could also be replaced by any small screen, such as an organic light emitting diode or liquid crystal display screen. Such lights or screens could be on the exterior surface of gaming apparatus 1300, or below the surface, if the shell for this apparatus is translucent or transparent. Other components of gaming apparatus 1300 may be removable, detachable or separable from this device. For example, scanning laser projector 1302 may be detachable or separable from gaming housing 1389. In some embodiments, the subcomponents of scanning laser projector 100 may be detachable or separable from gaming housing 1389, and still function.

Turning to FIG. 12, a perspective view of a gaming apparatus 1400 in accordance with various embodiments is illustrated. Gaming apparatus 1400 includes buttons 1404, display 1410, and projector 1402. In some embodiments, gaming apparatus 1400 is a standalone apparatus that does not need a larger console for a user to play a game. For example, a user may play a game while watching display 1410 and/or the projected content. In other embodiments, gaming apparatus 1400 operates as a controller for a larger gaming console. In these embodiments, a user may watch a larger screen tethered to the console in combination with watching display 1410 and/or projected content.

In one embodiment, a scanning laser projector is provided. The scanning laser projector comprises: at least one source of laser light; a first solid figure element, a polarizing beam splitter, and a second solid figure element, the polarizing beam splitter positioned between the first solid figure element and the second solid figure element, the first solid figure element configured to receive the laser light and pass the laser light to the polarizing beam splitter, the polarizing beam splitter configured to pass a first portion of the laser light having a first polarization to the second solid figure element, and reflect a second portion of the laser light having a second polarization back to the first solid figure element, the second solid figure element configured to internally reflect the first portion of the laser light off at least three internal faces and output the internally reflected first portion of the laser light into the second solid figure element, and wherein the internally reflected first portion of laser light is spatially recombined with the second portion of laser light in the first solid figure element to form a recombined laser light beam, and wherein the first solid figure element outputs the recombined laser light; at least one scanning mirror configured to reflect the recombined laser light beam; and a drive circuit configured to provide an excitation signal to excite motion of the scanning mirror to reflect the recombined laser light beam in a raster pattern of scan lines.

In another embodiment, a scanning laser projector is provided, where the scanning laser projector comprises: at least one source of laser light, the laser light having substantially linear polarization; a speckle reduction component, the speckle reduction component configured to receive the laser light, the speckle reduction component including: a polarization adjuster, the polarization adjuster configured to receive the laser light and convert the laser light to orthogonally polarized light having orthogonal polarization components with equal optical power; a prism element, a polarizing beam splitter, and a polyhedron element, the polarizing beam splitter positioned between the prism element and the polyhedron element, the prism element configured to receive the laser light from the polarization adjuster and pass the laser light to the polarizing beam splitter, the polarizing beam splitter configured to pass a first portion of the laser light having a P polarization to the polyhedron element, and reflect a second portion of the having a S polarization back to the prism element, the polyhedron element having at least four faces, with a first of the four faces adjacent to the prism element, and wherein a second, third and fourth faces of the four faces are configured to provide total internal reflection of the first portion of the laser light and output the internally reflected first portion of the laser light into the prism element, and wherein the internally reflected first portion of laser light is spatially recombined with the second portion in the prism element to generate a recombined laser light beam, and wherein the prism element outputs the recombined laser light beam; at least one scanning mirror configured to reflect the recombined laser light beam; and a drive circuit configured to provide an excitation signal to excite motion of the scanning mirror to reflect the recombined laser light beam in a raster pattern of scan lines.

In another embodiment, a method of projecting an image is provided. The method comprises: generating a laser light; splitting the laser light into a first portion and a second portion with a polarization beam splitter; passing the first portion of the laser light to a solid figure element and internally reflecting the first portion off at least three internal faces of the solid figure element; spatially recombining the internally reflected first portion with the second portion to generate a recombined laser beam; and exciting motion of a scanning mirror to reflect the recombined laser beam in a raster pattern of scan lines.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector, comprising:
   at least one source of laser light;
   a first solid figure element, a polarizing beam splitter, and a second solid figure element, the polarizing beam splitter positioned between the first solid figure element and the second solid figure element, the first solid figure element configured to receive the laser light and pass the laser light to the polarizing beam splitter, the polarizing beam splitter configured to pass a first portion of the laser light having a first polarization to the second solid figure element, and reflect a second portion of the laser light having a second polarization back to the first solid figure element, the second solid figure element configured to internally reflect the first portion of the laser light off at least three internal faces and output the internally reflected first portion of the laser light into the second solid figure element, and wherein the internally reflected first portion of laser light is spatially recombined with the second portion of laser light in the first solid figure element to form a recombined laser light beam, and wherein the first solid figure element outputs the recombined laser light, and wherein the laser light has a non-circular spatial distribution when received at the first solid figure element, and wherein the first solid figure element has an input face and an output face, and wherein the output face is configured such that the recombined laser light beam is output at a non-orthogonal angle to the output face and is spatially circularized upon exiting the output face;
   at least one scanning mirror configured to reflect the recombined laser light beam; and
   a drive circuit configured to provide an excitation signal to excite motion of the scanning mirror to reflect the recombined laser light beam in a raster pattern of scan lines.

2. The scanning laser projector of claim 1, wherein the first solid figure element comprises a prism.

3. The scanning laser projector of claim 1, wherein the second solid figure element comprises four faces, with a first face of the four faces adjacent to the first solid figure element, and wherein a second face, third face and fourth faces of the four faces are configured for total internal reflection of the first portion of the laser light.

4. The scanning laser projector of claim 3, wherein the second solid figure element comprises a polyhedron.

5. The scanning laser projector of claim 1, wherein the at least three internal faces are configured to provide total internal reflection of the first portion of the laser light.

6. The scanning laser projector of claim 1, wherein the first polarization comprises a P polarization and wherein the second polarization comprises an S polarization.

7. The scanning laser projector of claim 1, further comprising a polarization adjuster, the polarization adjuster configured to receive the laser light from the at least one source of laser light and further configured to adjust the laser light to have optical power along two orthogonal polarizations.

8. The scanning laser projector of claim 1, wherein the second solid figure element is configured to introduce a relative delay between the first portion of the laser light and the second portion of the laser light, where the relative delay is greater than a coherence length of the laser light.

9. The scanning laser projector of claim 8, wherein the coherence length is defined as $$L_c = \frac{\lambda^2}{\Delta\lambda}$$

where $\lambda$ is the central wavelength of the laser light, and $\Delta\lambda$ is a full width half maximum (FWHM) spectral bandwidth of the laser light.

10. The scanning laser projector of claim 1, wherein the polarizing beam splitter comprises a coating applied to at least one of the first solid figure element and the second solid figure element.

11. The scanning laser projector of claim 1, wherein an anti-reflective coating is applied to both the input face and the output face.

12. A scanning laser projector, comprising:
   at least one source of laser light, the laser light having substantially linear polarization;
   a speckle reduction component, the speckle reduction component configured to receive the laser light, the speckle reduction component including:
      a polarization adjuster, the polarization adjuster configured to receive the laser light and convert the laser light to orthogonally polarized light having orthogonal polarization components with equal optical power; and
      a prism element, a polarizing beam splitter, and a polyhedron element, the polarizing beam splitter positioned between the prism element and the polyhedron element, the prism element configured to receive the laser light from the polarization adjuster and pass the laser light to the polarizing beam splitter, the polarizing beam splitter configured to pass a first portion of the laser light having a P polarization to the polyhedron element, and reflect a second portion of the having a S polarization back to the prism element, the polyhedron element having at least four faces, and with a first of the four faces adjacent to the prism element, and wherein a second, third and fourth faces of the four faces are configured to provide total internal reflection of the first portion of the laser light and then output the first portion of the laser light into the prism element, and wherein the first portion of laser light is spatially recombined with the second portion in the prism element to generate a recombined laser light beam, and wherein the prism element outputs the recombined laser light beam, and wherein the laser light has a non-circular spatial distribution when received at the prism element, and wherein the prism element has an input face and an output face, and wherein the output face is configured such that the recombined laser light beam is output at a non-orthogonal angle to the output face and is spatially circularized upon exiting the output face;

at least one scanning mirror configured to reflect the recombined laser light beam; and a drive circuit configured to provide an excitation signal to excite motion of the scanning mirror to reflect the recombined laser light beam in a raster pattern of scan lines.

13. A method of projecting an image, comprising:

generating a laser light, the laser light having a non-circular spatial distribution;

splitting the laser light into a first portion and a second portion with a polarization beam splitter;

passing the first portion of the laser light to a solid figure element and internally reflecting the first portion off at least three internal faces of the solid figure element;

spatially recombining the internally reflected first portion with the second portion to generate a recombined laser light beam, wherein the recombined laser light beam is output at a non-orthogonal angle to a surface to spatially circularize the recombined laser light beam; and exciting motion of a scanning mirror to reflect the recombined laser light beam in a raster pattern of scan lines.

14. The method of claim 13, wherein the solid figure element comprises at least four faces, with a first face of the four faces adjacent to a prism, and wherein a second face, third face and fourth faces of the four faces are configured to provide total internal reflection of the first portion of the laser light.

15. The method of claim 13, wherein internally reflecting the first portion off at least three internal faces of the solid figure element comprises using total internal reflection.

16. The method of claim 13, further comprising adjusting the laser light to have optical power along two orthogonal polarizations.

17. The method of claim 13, wherein passing the first portion of the laser light to a solid figure element and internally reflecting the first portion off at least three internal faces of the solid figure element introduces a relative delay between the first portion of the laser light and the second portion of the laser light, where the relative delay is greater than a coherence length of the laser light.

18. The method of claim 17, wherein the coherence length is defined as $$L_c = \frac{\lambda^2}{\Delta\lambda}$$

where $\lambda$ is the central wavelength of the laser light, and $\Delta\lambda$ is a full width half maximum (FWHM) spectral bandwidth of the laser light.

* * * * *